United States Patent
Lethellier

[19]
[11] Patent Number: 6,144,565
[45] Date of Patent: Nov. 7, 2000

[54] VARIATION ON A SINGLE-ENDED PRIMARY INDUCTOR CONVERTER

[75] Inventor: Patrice R. Lethellier, Oxnard, Calif.

[73] Assignee: Semtech Corporation, Newbury Park, Calif.

[21] Appl. No.: 09/357,672

[22] Filed: Jul. 20, 1999

[51] Int. Cl.[7] .......................... H02M 3/335; H02M 7/00; G05F 1/10
[52] U.S. Cl. .............................. 363/16; 363/123; 323/222
[58] Field of Search .................... 363/16, 20, 21, 363/123, 131; 323/222, 282, 287

[56] References Cited

U.S. PATENT DOCUMENTS

| | | | |
|---|---|---|---|
| 4,931,716 | 6/1990 | Jovanovic et al. | 323/285 |
| 5,204,809 | 4/1993 | Andresen | 363/132 |
| 5,313,382 | 5/1994 | Farrington | 363/16 |
| 5,583,421 | 12/1996 | Barbehenn et al. | 323/222 |
| 5,642,267 | 6/1997 | Brkovic et al. | 363/16 |
| 5,668,466 | 9/1997 | Vinciarelli et al. | 323/282 |
| 5,682,306 | 10/1997 | Jansen | 363/16 |
| 5,694,302 | 12/1997 | Faulk | 363/16 |
| 5,706,182 | 1/1998 | Faulk | 363/16 |
| 5,736,842 | 4/1998 | Jovanovic | 363/21 |
| 5,786,990 | 7/1998 | Marrero | 363/16 |
| 5,790,389 | 8/1998 | Hua | 363/20 |
| 5,844,787 | 12/1998 | Fraidlin et al. | 363/21 |

*Primary Examiner*—Peter S. Wong
*Assistant Examiner*—Bao Q. Vu
*Attorney, Agent, or Firm*—D'Alessandro & Ritchie

[57] ABSTRACT

A switched mode DC-DC power converter of the flyback type includes a primary circuit and a secondary circuit capacitively coupled to one another. In a first aspect the primary includes circuitry for achieving a 2:1 current transfer gain over the input, in a second aspect the secondary includes circuitry for achieving a 2:1 current transfer gain over an input. Combined, a 4:1 current transfer gain may be realized.

42 Claims, 4 Drawing Sheets

VARIATION ON A SINGLE-ENDED PRIMARY INDUCTOR CONVERTER

BACKGROUND OF THE INVENTION

1. Field of the Invention

The present invention is directed to DC-DC switched mode power converters utilizing flyback-type converter circuits of the SEPIC (single-ended primary inductor converter) type.

2. The Background

Switched mode DC-DC power converters are common in the electronics industry. They are frequently used to convert one available DC level voltage to another DC level voltage, often needed for a particular set of semiconductor chips. Such power converters generally use one or more electrically controlled switches (such as N- or P-Channel MOSFETs) the gates of which are controlled by a switched mode power supply controller circuit which is often integrated onto a single chip.

As electronic devices become faster, smaller and more portable, the need for increased electrical efficiency in DC-DC converters used in these devices is becoming more important. Energy wasted in portable electronics devices prematurely drains the battery powering the device and creates waste heat which must be managed. Relatively small increases in overall electrical efficiency—such as from 75% to 85%—result in a major decrease in wasted power and waste heat—e.g., from 25% to 15%.

Turning now to FIG. 1, a basic flyback converter circuit adapted as a switched mode power as known in the art is shown. An input DC voltage is applied between the input terminals denoted Vin and GND. GND may be any fixed potential such as 0 volts DC relative to Vin. An input capacitor C1 preferably filters the input and may be disposed between Vin and GND. Winding W1 of inductor L is disposed between Vin and node 10. Switch Q1, which is shown as an N-Channel MOSFET, conducts current from a first terminal (drain) connected to node 10 to a second terminal (source) connected to GND when the gate of Q1 is powered by switching signal SS on line 12 from switched mode controller 14. Switched mode controller 14 may itself be powered from Vin and GND or another convenient power source. SENSE input on line 16 provides an indication of the output voltage Vout to controller 14 so that it may adjust the duty cycle of the switching signal SS to adjust Vout to a pre-programmed output voltage. The pre-programmed output voltage may be set in a number of ways known to those of skill in the art, such as with external components (not shown), built-in components, and the like.

Winding W2 of inductor L is lightly magnetically coupled to winding W1, as in a transformer, and utilizes the turns ratio difference between W1 and W2 to step the voltage approximately to Vout. Additional voltage correction is accomplished by varying the duty cycle on SS as discussed above. Diode D1 is disposed between a first terminal of W2 and Vout. The second terminal of W2 is connected to GND'. Preferably capacitor C2 is disposed between Vout and GND' to act as a filter. GND and GND' may be isolated from one another or connected together, as desired. The polarities of W1 and W2 (as are the polarities of all inductors herein) are as shown by the dots in the schematic diagram.

A disadvantage of this design is the lack of tight coupling between W1 and W2. The energy stored in the leakage inductance is wasted and creates a relatively large voltage spike on Q1 which needs to be clamped. As a result, power is wasted and larger, more voltage tolerant components must be utilized.

It would be desirable to have a high efficiency modification of this circuit to permit the high efficiency conversion of relatively high DC voltages to relatively low DC voltages without the drawbacks of the prior art.

SUMMARY OF THE INVENTION

A switched mode DC-DC power converter of the flyback type includes a primary circuit and a secondary circuit capacitively coupled to one another. In a first aspect the primary includes circuitry for achieving a 2:1 current transfer gain over the input, in a second aspect the secondary includes circuitry for achieving a 2:1 current transfer gain over an input. Combined, a 4:1 current transfer gain may be realized.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons after a perusal of this disclosure.

When a relatively large DC voltage must be stepped down to a relatively low DC voltage (such as 24 or 48 VDC down to 5, 3.3, 2.7 or 1.8 VDC) most of the time full isolation is not required, only a limited DC to DC floating capability for remote sense purposes. It would be desirable to have a circuit not requiring a transformer for cost, size and complexity reasons. The transformer in these sort of pulsed DC applications can become saturated and will then require time to recover. This, in turn, means that there is no power transfer during the recovery period, which requires larger, more expensive components to transfer the energy within a shorter time. It also results in the application of a voltage larger than Vin to the transistor Q1 which means that more expensive higher voltage transistors are required. Avoiding the use of a transformer avoids leakage inductance and the ringing of that inductance with the various parasitic capacitances found in the converter circuit.

Figure 1:
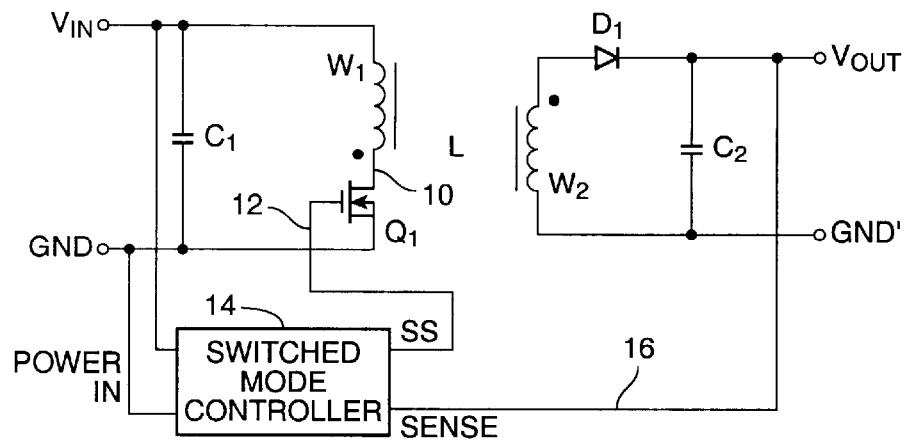
FIG. 1 is an electrical schematic diagram of a flyback converter circuit in accordance with the prior art.

FIG. 1, discussed above, describes an existing stepdown converter topology with a transformer providing isolation and current increase.

Figure 2:
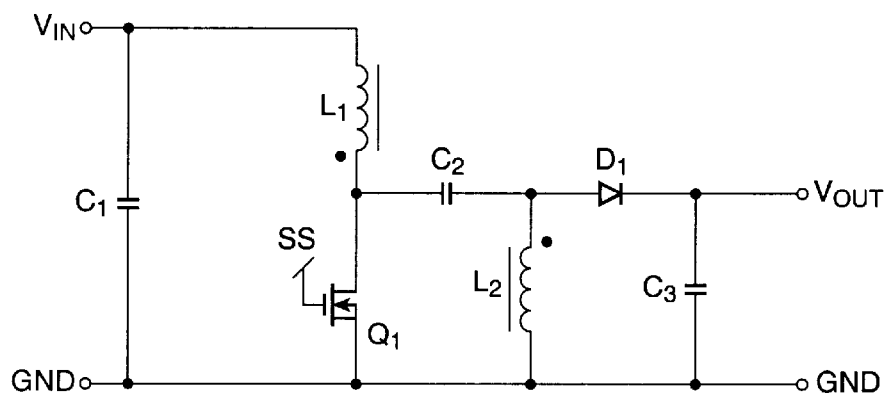
FIG. 2 is an electrical schematic diagram of a capacitively coupled flyback converter circuit of the SEPIC type in accordance with the prior art.

Turning now to FIG. 2 a circuit known as the SEPIC (single-ended primary inductor converter) is shown. In this circuit, inductors L1 and L2 are capacitively coupled at their same-polarity terminals by C2. In this way the capacitor C2 clamps the voltage spike to the secondary transferring the previously lost energy to the secondary portion of the circuit shown on the right. In this embodiment, the number of turns in L1 and L2 must be the same in order to take advantage of capacitive coupling. This removes the desirable full isolation and turn ratio advantage of the FIG. 1 embodiment. However, it takes care of the voltage spike due to the lack of coupling between both windings.

Figure 3:
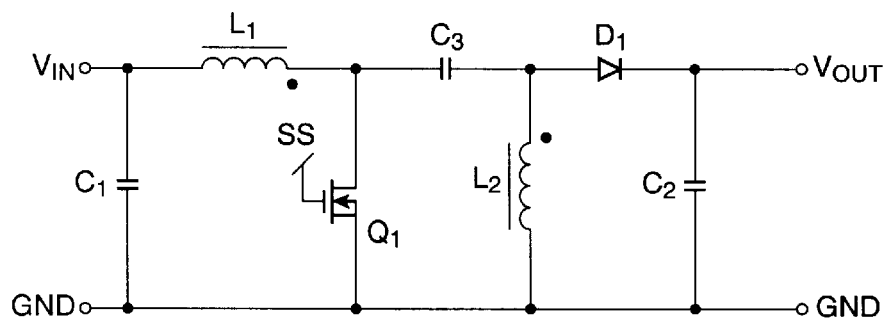
FIG. 3 is the circuit of FIG. 2 redrawn for clarity.

FIG. 3 is a version of the circuit of FIG. 2 redrawn for clarity. In accordance with the invention this circuit will be modified to provide limited isolation between the primary and the secondary portions of the circuit, implement two 2:1 improvements in current transfer yielding an overall 4:1 improvement, and provide an overall electrical efficiency improvement.

Figure 4:
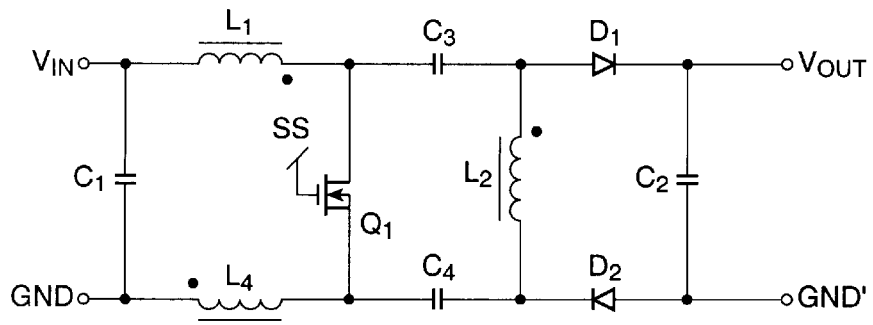
FIG. 4 is an electrical schematic diagram of a SEPIC-type converter in accordance with FIG. 3, redrawn to show C3 as a pair of capacitors C3 and C4, D1 as a pair of diodes D1 and D2, and L1 as a pair of inductors L1 and L4.
Figure 5:
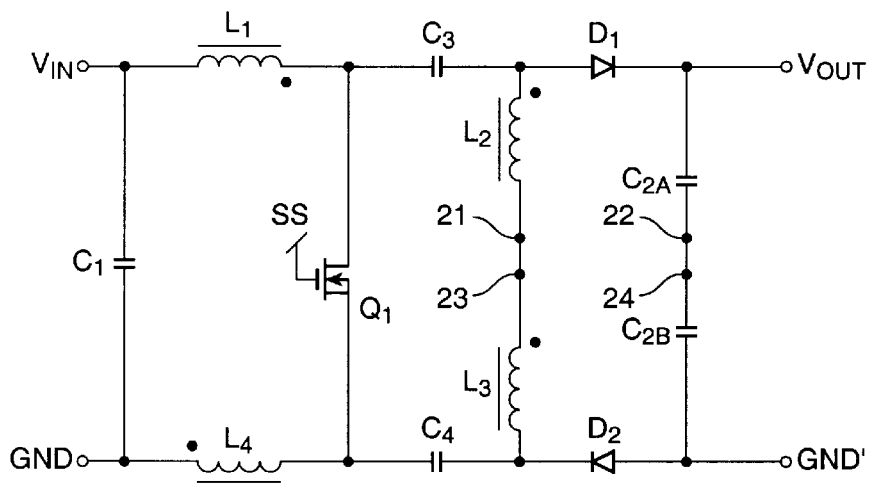
FIG. 5 is an electrical schematic diagram of a SEPIC-type converter in accordance with FIG. 4 modified to show inductor L2 as a pair of inductors L2 and L3 and capacitor C2 as a pair of capacitors C2a and C2b.

The circuit modification is illustrated in the following circuit diagrams FIGS. 3–9. First, on the primary side of the circuit, the inductance of L1 is split into L1 and L4, the capacitance of C3 is split into C3 and C4, and D2 is added to the secondary as shown in FIG. 4. This results in no significant electrical change yet Next, in FIG. 5, on the secondary side of the circuit, the inductance of L2 is split into L2 and L3 and the capacitance of C2 is split into C2a and C2b. So, for example, C2a=C2b=2*C2 with the result that each of C2a and C2b is taking one half of the voltage applied to the original C2.

Figure 6:
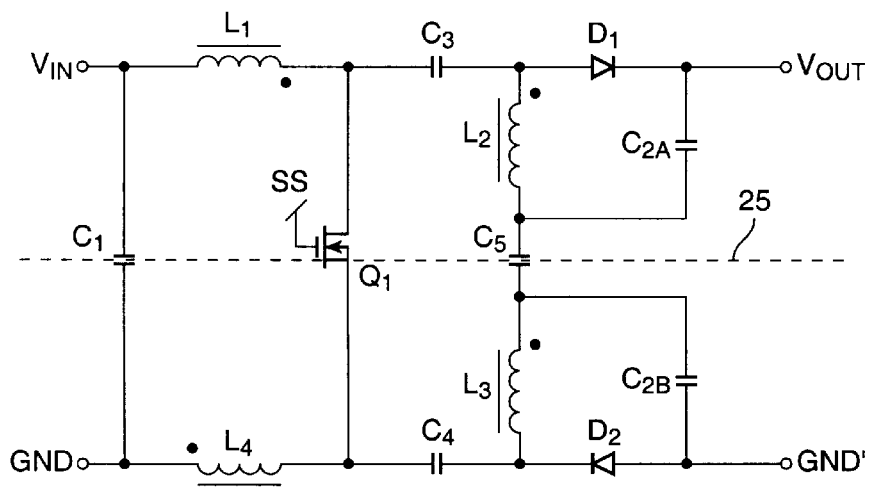
FIG. 6 is an electrical schematic diagram of a SEPIC-type converter modified from FIG. 5 with the introduction of C5 in the AC path.
Figure 7:
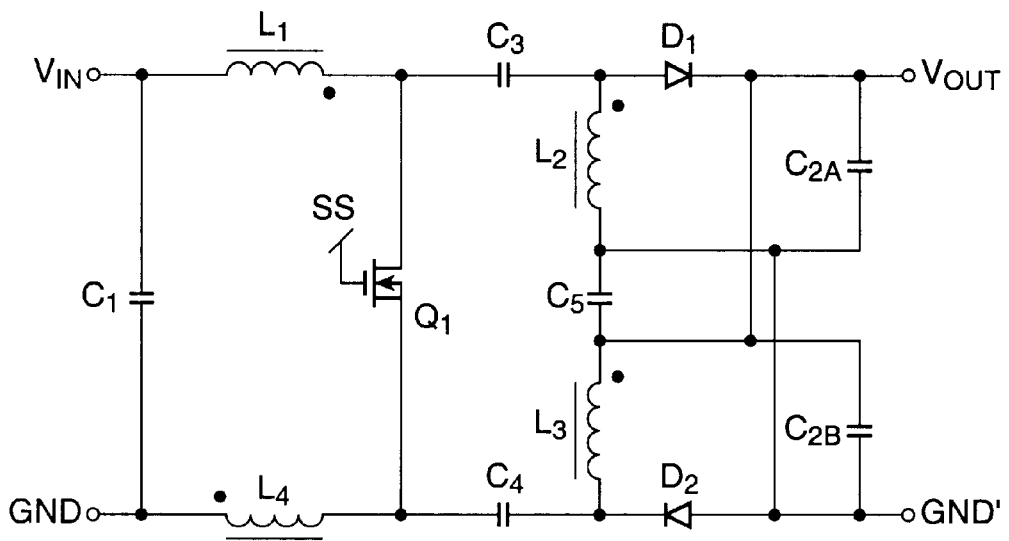
FIG. 7 is an electrical schematic diagram of a SEPIC-type converter in accordance with FIG. 6 modified so that the two floating DC outputs are paralleled for a factor of two current capability increase.

Now, the two nodes 21 and 22 and the two nodes 23 and 24 can be connected together because of symmetry and a large capacitance C5 introduced between nodes 21 and 23 without affecting the operation of the circuit because it is inserted in an AC path. This is shown in FIG. 6. Because the capacitor C5 is very large (e.g., large enough to carry the current and provide DC isolation for the designed parameters of the converter) and because there is now a horizontal axis of symmetry in the circuit about axis 25, the capacitors C2a and C2b in the secondary do not carry any AC voltage (common or differential mode) and they can now be paralleled in DC to increase the current capability as shown in FIG. 7.

Figure 8:
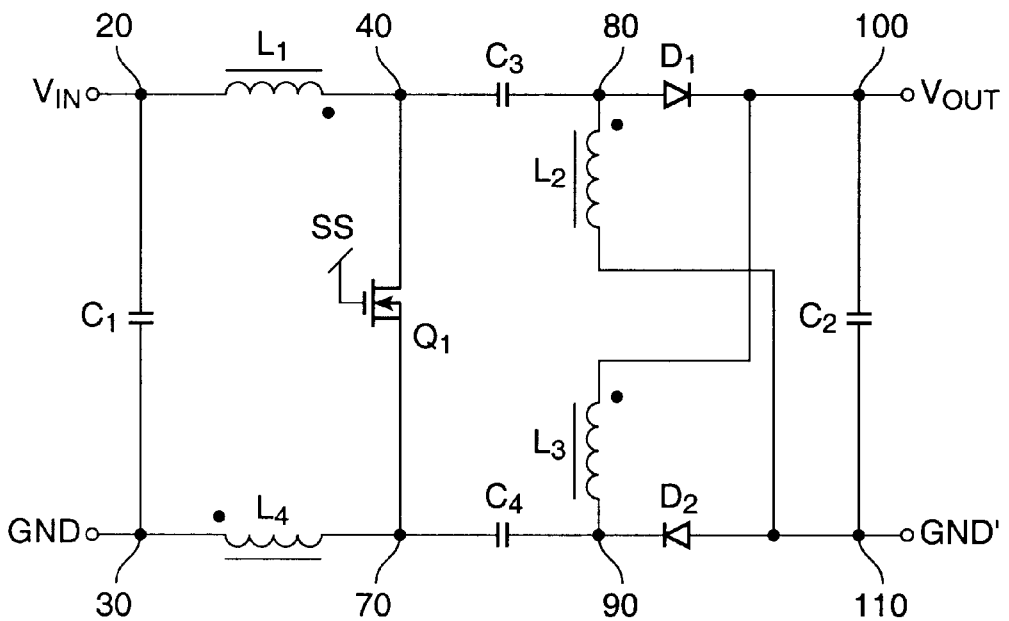
FIG. 8 is an electrical schematic diagram of a SEPIC-type converter in accordance with FIG. 7 redrawn for clarity.

Capacitors C2a, C2b end up in parallel with the previously introduced large capacitor C5 and can be grouped as a single capacitor C2 as shown in FIG. 8. This modification to the secondary provides a 2:1 current carrying capability enhancement over the original design of the SEPIC.

Figure 9:
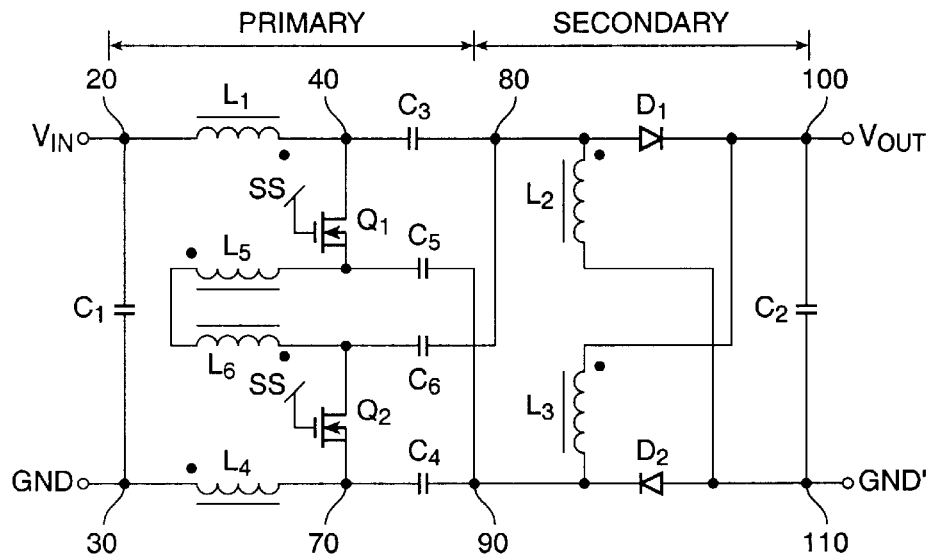
FIG. 9 is an electrical schematic diagram of a SEPIC-type converter in accordance with FIG. 8 modified so that the primary side of the circuit is split and paralleled for a factor of two current capability increase.

A similar modification can be made to the primary to obtain another 2:1 advantage. The primary is divided into two subsections in series and these subsections are paralleled in AC as shown in FIG. 9 at the left. The primary has been divided into two identical subsections, the inputs of the two subsections are in series and the outputs are in parallel. This achieves a second enhancement of the current transfer by a factor of two.

The modification to the primary, the modification to the secondary, or both can be used, as desired, to enhance current transfer in DC-DC switched mode flyback-type power converter circuits. The duty cycle is increased and this results in low voltage, low current commutations yielding higher efficiency with less loss. In the FIG. 9 embodiment, the secondary and the primary are entirely capacitively coupled to provide limited DC floating capability.

In FIG. 9 (and 11), node 20 is the first fixed voltage input node, node 30 is the second fixed voltage input node, node 100 is the first fixed voltage output node and node 110 is the second fixed voltage output node. Nodes 30 and 110 may or may not be isolated, as desired. Node 40 is the first terminal of the first switching device Q1, Node 50 is the second terminal of Q1, Node 60 is the first terminal of the second switching device, Q2, Node 70 is the second terminal of Q2. Node 80 is a first node coupled with capacitor C3 to Node 40. Node 90 is a second node coupled with capacitor C4 to Node is 70.

Comparing FIG. 8 with FIG. 9, L1 and L4 are split again to yield L1, L5, L6 and L4, all having the same number of turns. L5 and L6 are connected in series (and may simply be a single inductance having twice the number of turns as L1 and disposed between nodes 50 and 60. In AC C6 is added in parallel with C3 and C5 is added in parallel with C4. The switch Q1 is split into two switches Q1 and Q2 operating in phase. Q1 is connected between nodes 40 and 50 and Q2 is connected between nodes 60 and 70. This effectively splits the primary into two series-connected primaries and permits a factor of two increase in switch duty cycle and a consequent factor of two increase in current capability.

Thus, the following are provided by this approach:

1. a step down converter with a current amplification of 2 or 4, as desired;
2. a switching duty cycle of 2 or 4 times the equivalent buck converter, for higher efficiency;
3. low voltage and low current commutations;
4. a limited floating output capability with no common mode noise created;
5. a single inductance with multiple windings having non-critical coupling (L1, L2, L3, L4, L5 and L6 may all be wound on the same inductor, preferably a torroid, and L1, L5, L6 and L4 have the same number of windings (N/4) and L2 and L3 have the same number of windings (N/2) where N was the number of windings on the original L1 and L2 of FIG. 2;
6. The output diodes D1 and D2 can be replaced with low-Rds-on MOSFETs for additional electrical efficiency gains because the voltage drop on such a MOSFET can be reduced over the voltage drop of a diode, from about 0.5V to about 0.1V;
7. No transformer is required, thus no transformer recovery problems need to be accounted for and costs are saved.

ALTERNATIVE EMBODIMENTS

Figure 10:
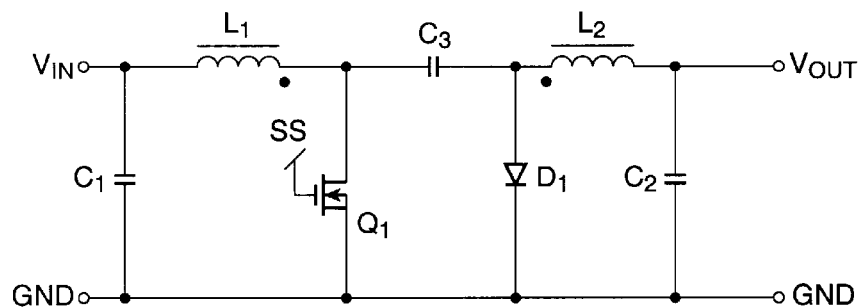
FIG. 10 is an electrical schematic diagram of a capacitively coupled converter circuit of the CUK type in accordance with the prior art.
Figure 11:
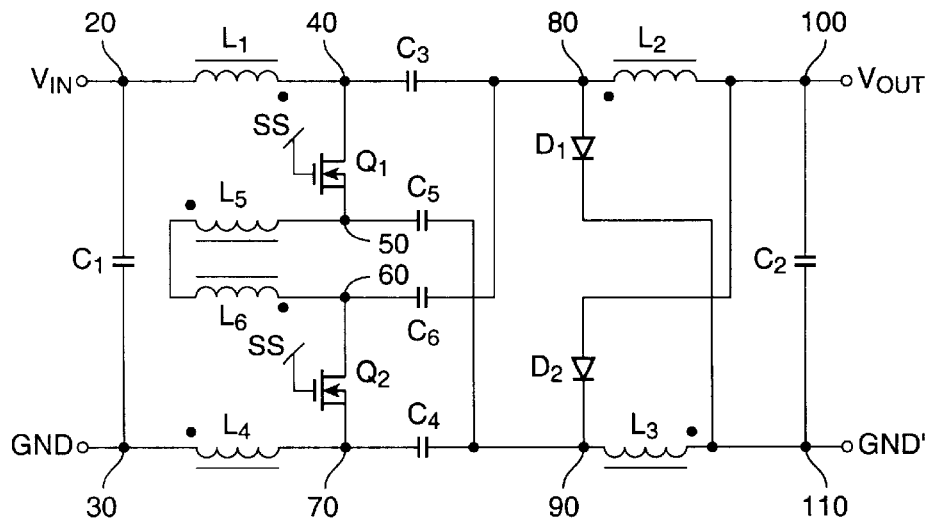
FIG. 11 is an electrical schematic diagram of a capacitively coupled converter circuit of the CUK-type modified in accordance with an embodiment of the present invention to achieve a factor of two current capability increase on the primary and on the secondary in a similar fashion as the circuit of FIG. 9.

Those of ordinary skill in the art will recognize that the Cuk-type of converter shown schematically in FIG. 10 is essentially a type of SEPIC and can this be modified in much the same way as the SEPIC type of converter to yield the circuit of FIG. 11. In the Cuk circuit so modified, as compared with the circuit of FIG. 9, diode D1 is positionally exchanged with inductor L2, retaining polarity so that L1 and L2 may be capacitively coupled, and diode D2 and inductor L3 are positionally exchanged in the same manner. In all other respects, the circuits of FIG. 9 and FIG. 11 are equivalent.

While embodiments and applications of this invention have been shown and described, it would be apparent to those skilled in the art, after a review of this disclosure, that many more modifications than mentioned above are possible without departing from the inventive concepts herein. The invention, therefore, is not to be restricted except in the spirit of the appended claims.

What is claimed is:

1. A DC-DC converter, comprising:

a first fixed voltage input node;

a second fixed voltage input node;

a first fixed voltage output node;

a second fixed voltage output node;

a first switching device having a switching input, a first terminal and a second terminal;

a second switching device having a switching input, a first terminal and a second terminal;

first, second, third and fourth inductors, all having the same number of windings and each having a first and a second terminal, all said first terminals being of a first polarity and all said second terminals being of an opposite polarity;

said first inductor having a first terminal connected to said first fixed voltage input node and said second terminal connected to said first terminal of said first switching device;

said second inductor and said third inductor connected in series so that said first terminal of said second inductor is connected to said second terminal of said first switching device, said second terminal of said second inductor is connected to said first terminal of said third inductor, and said second terminal of said third inductor is connected to said first terminal of said second switching device;

said second terminal of said second switching device connected to said first terminal of said fourth inductor and said second terminal of said fourth inductor connected to said second fixed voltage input node;

said switching input of said first switching device and said switching input of said second switching device connected to a source of a switching signal.

2. A converter in accordance with claim 1, further comprising:

a capacitor disposed between said first fixed voltage input node and said second fixed voltage input node.

3. A converter in accordance with claim 1, further comprising:

a first capacitor disposed between said first terminal of said first switching device and a first node;

a second capacitor disposed between said second terminal of said first switching device and a second node;

a third capacitor disposed between said first terminal of said second switching device and said first node;

a fourth capacitor disposed between said second terminal of said second switching device and said second node.

4. A converter in accordance with claim 3, further comprising:

a capacitor disposed between said first fixed voltage input node and said second fixed voltage input node.

5. A converter in accordance with claim 3, further comprising:

a rectification circuit coupling said first and second nodes with said first fixed voltage output node and said second fixed voltage output node.

6. A converter in accordance with claim 5, further comprising:

a capacitor disposed between said first fixed voltage input node and said second fixed voltage input node.

7. A converter in accordance with claim 5, further comprising:

a filter disposed between said first fixed voltage output node and said second fixed voltage output node.

8. A converter in accordance with claim 7 wherein:

said filter includes a capacitor.

9. A converter in accordance with claim 5, wherein said rectification circuit comprises:

fifth and sixth inductors, both having the same number of windings and both having a first and a second terminal, both said first terminals being of said first polarity and both said second terminals being of said opposite polarity;

said second terminal of said fifth inductor connected to said first node;

said first terminal of said fifth inductor connected to said first fixed voltage output node;

a first diode having an anode connected to said first node and a cathode connected to said first fixed voltage output node;

a second diode having an anode connected to said second fixed voltage output node and a cathode connected to said second node;

said second terminal of said sixth inductor connected to said first fixed voltage output node;

said first terminal of said sixth inductor connected to said second node.

10. A converter in accordance with claim 9, further comprising:

a capacitor connected between said first fixed voltage input node and said second fixed voltage input node.

11. A converter in accordance with claim 9, further comprising:

a capacitor connected between said first fixed voltage output node and said second fixed voltage output node.

12. A converter in accordance with claim 9, wherein said first, second, third, fourth, fifth and sixth inductors are all wound on the same core.

13. A converter in accordance with claim 9, wherein said first, second, third and fourth inductors all have the same number of windings.

14. A converter in accordance with claim 9, wherein said fifth and sixth inductors both have the same number of windings.

15. A converter in accordance with claim 9 wherein said first, second, third and fourth inductors have N windings and said fifth and sixth inductors have 2N windings.

16. A converter in accordance with claim 9 wherein said second fixed voltage input node and said second fixed voltage output node are connected so that they are held at the same voltage.

17. A DC-DC converter, comprising:
- a first fixed voltage input node for connecting to a first fixed input voltage;
- a second fixed voltage input node for connecting to a second fixed input voltage;
- a first fixed output voltage output node for providing a first fixed output voltage;
- a second fixed voltage output node for providing a second fixed output voltage;
- a switched primary circuit for developing a switched AC signal between a first node and a second node;
- said first node capacitively coupled to a third node;
- said second node capacitively coupled to a fourth node;
- first and second inductors, both having the same number of windings and both having a first and a second terminal, both said first terminals being of a first polarity and both said second terminals being of an opposite polarity;
- said first inductor having a second terminal connected to said third node and said first terminal connected to said second fixed voltage output node;
- said second inductor having said first terminal connected to said fourth node and said second terminal connected to said first fixed voltage output node;
- a first diode having an anode connected to said third node and a cathode connected to said first fixed voltage output node; and
- a second diode having an anode connected to said second fixed voltage output node and a cathode connected to said fourth node.

18. A converter in accordance with claim 17, further comprising:
- a capacitor connected between said first fixed voltage input node and said second fixed voltage input node.

19. A converter in accordance with claim 17, further comprising:
- a capacitor connected between said first fixed voltage output node and said second fixed voltage output node.

20. A converter in accordance with claim 17, wherein said first and second inductors are both wound on the same core.

21. A converter in accordance with claim 17, wherein said first and second inductors both have the same number of windings.

22. A converter in accordance with claim 17 wherein said second fixed voltage input node and said second fixed voltage output node are connected so that they are held at the same voltage.

23. A DC-DC converter, comprising:
- a first fixed voltage input node for connecting to a first fixed input voltage;
- a second fixed voltage input node for connecting to a second fixed input voltage;
- a first fixed voltage output node for providing a first fixed voltage output;
- a second fixed voltage output node for providing a second fixed voltage output;
- a switched primary circuit for developing a switched AC signal between a first node and a second node;
- first and second inductors, both having the same number of windings and both having a first and a second terminal, both said first terminals being of a first polarity and both said second terminals being of an opposite polarity;
- said first inductor having a second terminal connected to said first node and said first terminal connected to said first fixed voltage output node;
- said second inductor having said first terminal connected to said second node and said second terminal connected to said second fixed voltage output node;
- a first diode having a cathode connected to said second fixed voltage output node and an anode connected to said first node;
- a second diode having a cathode connected to said second node and an anode connected to said first fixed voltage output node.

24. A converter in accordance with claim 23, further comprising:
- a capacitor connected between said first fixed voltage input node and said second fixed voltage input node.

25. A converter in accordance with claim 23, further comprising:
- a capacitor connected between said first fixed voltage output node and said second fixed voltage output node.

26. A converter in accordance with claim 23, wherein said first and second inductors are both wound on the same core.

27. A converter in accordance with claim 23, wherein said first and second inductors both have the same number of windings.

28. A converter in accordance with claim 23 wherein said second fixed voltage input node and said second fixed voltage output node are connected so that they are held at the same voltage.

29. A DC-DC converter, comprising:
- a first fixed voltage input node for connecting to a source of a first input voltage;
- a second fixed voltage input node for connecting to a source of a second input voltage;
- a first fixed voltage output node for providing a first fixed voltage output;
- a second fixed voltage output node for providing a second fixed voltage output;
- a first switching device having a switching input, a first terminal and a second terminal;
- a second switching device having a switching input, a first terminal and a second terminal;
- first, second, third and fourth inductors, all having the same number of windings and each having a first and a second terminal, all said first terminals being of a first polarity and all said second terminals being of an opposite polarity;
- said first inductor having a first terminal connected to said first fixed voltage input node and said second terminal connected to said first terminal of said first switching device;
- said second inductor and said third inductor connected in series so that said first terminal of said second inductor is connected to said second terminal of said first switching device, said second terminal of said second inductor is connected to said first terminal of said third inductor, and said second terminal of said third inductor is connected to said first terminal of said second switching device;
- said second terminal of said second switching device connected to said first terminal of said fourth inductor and said second terminal of said fourth inductor connected to said second fixed voltage input node;
- said switching input of said first switching device and said switching input of said second switching device connected to a source of a switching signal;

a first capacitor disposed between said first terminal of said first switching device and a first node;

a second capacitor disposed between said second terminal of said first switching device and a second node;

a third capacitor disposed between said first terminal of said second switching device and said first node;

a fourth capacitor disposed between said second terminal of said second switching device and said second node;

fifth and sixth inductors, both having the same number of windings and both having a first and a second terminal, both said first terminals being of said first polarity and both said second terminals being of said opposite polarity;

said fifth inductor having a second terminal connected to said first node and said first terminal connected to said first fixed voltage output node;

said second inductor having said first terminal connected to said second node and said second terminal connected to said second fixed voltage output node;

a first diode having a cathode connected to said second fixed voltage output node and an anode connected to said first node;

a second diode having a cathode connected to said second node and an anode connected to said first fixed voltage output node.

30. A converter in accordance with claim 29, further comprising:

a capacitor connected between said first fixed voltage input node and said second fixed voltage input node.

31. A converter in accordance with claim 29, further comprising:

a capacitor connected between said first fixed voltage output node and said second fixed voltage output node.

32. A converter in accordance with claim 29, wherein said first, second, third, is fourth, fifth and sixth inductors are all wound on the same core.

33. A converter in accordance with claim 29, wherein said first, second, third and fourth inductors all have the same number of windings.

34. A converter in accordance with claim 29, wherein said fifth and sixth inductors both have the same number of windings.

35. A converter in accordance with claim 29 wherein said first, second, third and fourth inductors have N windings and said fifth and sixth inductors have 2N windings.

36. A converter in accordance with claim 29 wherein said second fixed voltage input node and said second fixed voltage output node are connected so that they are held at the same voltage.

37. A DC-DC converter, comprising:

a first fixed voltage input node for connecting to a first fixed input voltage;

a second fixed voltage input node for connecting to a second fixed input voltage;

a first fixed voltage output node for providing a first fixed output voltage;

a second fixed voltage output node for providing a second fixed output voltage;

a switched primary circuit for developing a switched AC signal between a first node and a second node;

first and second inductors, both having the same number of windings and both having a first and a second terminal, both said first terminals being of a first polarity and both said second terminals being of an opposite polarity;

said first inductor having a second terminal connected to said first node and said first terminal connected to said second fixed voltage output node;

said second inductor having said first terminal connected to said second node and said second terminal connected to said first fixed voltage output node;

a first diode having an anode connected to said first node and a cathode connected to said first fixed voltage output node; and a second diode having an anode connected to said second fixed voltage output node and a cathode connected to said second node.

38. A converter in accordance with claim 37, further comprising:

a capacitor connected between said first fixed voltage input node and said second fixed voltage input node.

39. A converter in accordance with claim 37, further comprising:

a capacitor connected between said first fixed voltage output node and said second fixed voltage output node.

40. A converter in accordance with claim 37, wherein said first and second inductors are both wound on the same core.

41. A converter in accordance with claim 37, wherein said first and second inductors both have the same number of windings.

42. A converter in accordance with claim 37 wherein said second fixed voltage input node and said second fixed voltage output node are connected so that they are held at the same voltage.

* * * * *